US 7,839,322 B2

(12) United States Patent
Filias et al.

(10) Patent No.: US 7,839,322 B2
(45) Date of Patent: Nov. 23, 2010

(54) SYSTEM FOR DETECTING OBSTACLES IN THE VICINITY OF A TOUCHDOWN POINT

(75) Inventors: François-Xavier Filias, Lambesc (FR); Jean Sequeira, Marseilles (FR)

(73) Assignee: Eurocopter, Marignane (FR)

( * ) Notice: Subject to any disclaimer, the term of this patent is extended or adjusted under 35 U.S.C. 154(b) by 494 days.

(21) Appl. No.: 11/765,464

(22) Filed: Jun. 20, 2007

(65) Prior Publication Data

US 2007/0290918 A1    Dec. 20, 2007

(30) Foreign Application Priority Data

Jun. 20, 2006    (FR) .................................. 06 05480

(51) Int. Cl.
*G01S 13/93* (2006.01)
*G01S 13/06* (2006.01)
*G01S 13/00* (2006.01)

(52) U.S. Cl. ............................. 342/33; 342/27; 342/61; 342/63; 342/65; 342/118; 342/120; 342/175; 342/195; 340/945; 340/963; 340/971; 701/1; 701/3; 701/16; 701/17; 701/18; 701/300; 701/301

(58) Field of Classification Search .................. 342/27, 342/28, 29, 33, 61–65, 118, 120–123, 175–186, 342/195, 52–55, 450–465; 701/1–18, 120, 701/300, 301; 340/933, 945–947, 952–957, 340/961, 963, 964, 971, 972, 977, 983
See application file for complete search history.

(56) References Cited

U.S. PATENT DOCUMENTS

| 3,184,738 | A | * | 5/1965 | Hague et al. ................... 342/29 |
| 3,187,328 | A | * | 6/1965 | Vetter ........................... 342/65 |
| 3,188,632 | A | * | 6/1965 | Jeromson ....................... 342/65 |
| 3,287,724 | A | * | 11/1966 | Zupanick et al. ............... 342/65 |
| 3,530,465 | A | * | 9/1970 | Zupanick et al. ............... 342/65 |
| 3,568,187 | A | * | 3/1971 | Bechtel et al. ................. 342/65 |
| 3,686,626 | A | * | 8/1972 | Bateman et al. ............... 701/16 |
| 3,713,147 | A | * | 1/1973 | Chanzit et al. ................ 342/65 |
| 3,886,306 | A |   | 5/1975 | Fayard et al. |
| 4,302,827 | A | * | 11/1981 | Rosenblum .................. 340/964 |
| 4,481,516 | A | * | 11/1984 | Michelotti ................... 340/933 |
| 4,646,244 | A | * | 2/1987 | Bateman et al. ............. 701/301 |
| 4,951,056 | A | * | 8/1990 | Cope et al. .................... 342/29 |
| 5,208,601 | A | * | 5/1993 | Hart ............................ 342/33 |
| 5,371,581 | A | * | 12/1994 | Wangler et al. ............. 340/946 |
| 5,555,175 | A |   | 9/1996 | D'Orso |
| 5,864,307 | A | * | 1/1999 | Henley ........................ 340/964 |

(Continued)

FOREIGN PATENT DOCUMENTS

EP    0 652 544 A1    5/1995

*Primary Examiner*—Bernarr E Gregory
(74) *Attorney, Agent, or Firm*—Young & Thompson (57) ABSTRACT

A method of detecting obstacles on board an aircraft while in the vicinity (44) of a touchdown point (27, 42), includes the following operations:
  selecting/determining a path (41) to be followed by the aircraft overflying the touchdown point;
  the aircraft overflying the touchdown point following the overflight path, and during the overflight recording signals/data delivered by an on-board rangefinder observing a portion of space extending below the aircraft;
  analyzing the rangefinder data to detect the presence of obstacles and to determine their positions in a terrestrial frame of reference, where appropriate to determine their dimensions; and
  recording the detected obstacle position data, and dimensions, if any, in a memory.

25 Claims, 5 Drawing Sheets

U.S. PATENT DOCUMENTS

| | | | |
|---|---|---|---|
| 5,945,926 A * | 8/1999 | Ammar et al. | 340/963 |
| 6,101,431 A | 8/2000 | Niwa et al. | |
| 6,144,915 A * | 11/2000 | Shiomi et al. | 701/120 |
| 6,219,594 B1 * | 4/2001 | Nicosia et al. | 701/16 |
| 6,243,482 B1 * | 6/2001 | Eibert et al. | 701/301 |
| 6,606,034 B1 * | 8/2003 | Muller et al. | 340/963 |
| 6,650,407 B2 | 11/2003 | Jamieson et al. | |
| 6,850,185 B1 * | 2/2005 | Woodell | 342/33 |
| 6,885,334 B1 * | 4/2005 | Hager et al. | 342/62 |
| 7,400,951 B2 * | 7/2008 | Artini et al. | 701/3 |
| 7,479,920 B2 * | 1/2009 | Niv | 342/65 |

\* cited by examiner

SYSTEM FOR DETECTING OBSTACLES IN THE VICINITY OF A TOUCHDOWN POINT

The present invention relates to a system for detecting obstacles in the vicinity of a touchdown point.

BACKGROUND OF THE INVENTION

The technical field of the invention is that of manufacturing helicopters.

Accidents that result from an aircraft colliding with an obstacle that is not listed and that has not been detected are frequent and expensive.

OBJECTS AND SUMMARY OF THE INVENTION

An object of the invention is to propose a method and a device for detecting and informing the pilot of an aircraft of the presence of obstacles such as (suspended) overhead electric cables around a touchdown zone by using an obstacle warning system (OWS), a digital map display computer, and a flight management system (FMS) associated with navigation equipment.

An object of the invention is to enable a rotorcraft piloted by a human or by a computer to land and then to take off again safely.

In order to accomplish a variety of missions (civilian or military), the pilot of an aircraft may need to land and then to take off under emergency conditions.

When taking off again from a touchdown point, a pilot might have forgotten the exact locations of cables observed beforehand.

In order to identify visually obstacles such as cables in the vicinity of an arbitrary touchdown point on the surface of the Earth, certain human pilots carry out numerous passes over the touchdown point prior to landing, thereby taking time that can be harmful, particularly if the mission is for rescuing or evacuating the injured or soldiers.

A risk of collision with a cable can also arise because a cable has been badly identified (not seen) or wrongly located (problems of assessing distances).

An object of the present invention is to make safe a touchdown area with the help of a rangefinder (preferably a scanning laser rangefinder) capable of detecting suspended cables, and a map display system associated with navigation equipment enabling them to be located accurately.

The use of on-board (radar or laser) rangefinders for detecting cables presently suffers from shortcomings and drawbacks; the accuracy of a radar rangefinder is not sufficient to locate an overhead cable in three dimensions.

A laser rangefinder does not enable a cable to be detected when its longitudinal axis forms an angle of incidence of small value relative to the aiming axis of the rangefinder; the rangefinder also cannot detect a cable that is situated at the same level as the helicopter or higher; consequently, while a helicopter is taking off, and until it has reached a height that is sufficient to enable the rangefinder to detect cables situated in its "field of view", the helicopter is vulnerable to any nearby cables that the pilot has not identified or has forgotten.

There exist map systems using a database that list major cables, however such databases are not sufficiently complete, accurate, and up-to-date to ensure that all cables are listed.

On the basis of a "terrain" database, existing map display computers can display potentially dangerous obstacles in certain regions of the Earth together with a background map that corresponds to the current position of an aircraft, however such systems suffer from the above-mentioned shortcomings of databases.

It will be understood that detecting obstacles from on board an aircraft is the subject of a large amount of research, and that various aspects are described in numerous patents.

U.S. Pat. No. 5,621,807 describes a method of recognizing objects by comparing data delivered by a 3D camera with predetermined geometrical models.

Several patents relate to presenting information to the crew of an aircraft.

Document WO 01/90694 proposes two modes for warning a pilot of danger represented by relief, which modes can be selected by the pilot; document US-2004/0059473 relates to adjusting contrast in a terrain/relief data display; document US-2006/0087452 relates to synthesizing 3D images in the vicinity of a touchdown point on the basis of previously-recorded data, and on the basis of the approach movement of the helicopter.

U.S. Pat. No. 6,216,065 proposes creating a path for approaching a touchdown point from a position of the aircraft given by a GPS receiver, an on-board terrain and obstacle database, and terrain and obstacle map data delivered in "real time" by an on-board Doppler radar or laser diode; according to that patent, the obstacles in the database can be compared with those detected by the real time sensor in order to modify the approach path if the obstacles detected are different from those recorded in the database.

Various patents relate to detecting cables: patent GB 1 494 561 proposes using a laser rangefinder to scan following a spiral or in circles; U.S. Pat. Nos. 5,296,909, 5,762,292, and 6,747,576 describe using a Hough transform to detect cables; U.S. Pat. No. 6,278,409 proposes using polarized radio-waves; document US-2004/0178943 proposes using the Doppler effect in radar echoes, and document US-2006/0009887 proposes measuring a differential static electric field.

In spite of the magnitude and the variety of that research, considerable needs remain in the matter of detecting obstacles from on board aircraft.

An object of the invention is to propose a method or a program for detecting obstacles and a device or a system programmed to implement the method, that are improved and/or that remedy, at least in part, the shortcomings or drawbacks of known detection systems.

An object of the invention is to propose such systems that are better adapted to landing and taking off at a touchdown point situated in a region of the Earth for which there is no available database relating to the relief of the terrain or to obstacles that is very accurate and exhaustive (fully up-to-date).

According to an aspect of the invention, it is proposed, on board an aircraft: to acquire rangefinder measurement data of a region of ground surrounding a candidate touchdown point while overflying said region; to analyze the data on board the aircraft in order to identify, position, and determine the dimensions of relief or obstacles; to record data relating to the positions and the dimensions of obstacles detected by rangefinding; and after landing in the vicinity of the touchdown point, to use said recorded data for determining a take-off flight path.

In other words, a method is proposed for detecting on board an aircraft the presence of obstacles in the vicinity of a touchdown point, the method comprising the following operations:

selecting/determining a path to be followed by the aircraft overflying the touchdown point;

the aircraft overflying the touchdown point following the overflight path, and while overflying recording signals/ data delivered by an on-board rangefinder (on board the aircraft) observing a portion of space extending below the aircraft;

analyzing the rangefinder data to detect the presence of obstacles and to determine their positions in a ground-based frame of reference, and where appropriate to determine their dimensions; and recording the position data, and where appropriate the dimensions, of detected obstacles (in a memory associated with a computer of the aircraft).

In preferred embodiments of the invention:

a horizontal projection of the overflight path has two arcs or segments that cross at a point of intersection close to the touchdown point, such that the aircraft makes two successive overflights over the touchdown point following two different headings, and in particular it makes only two overflights;

the value of the angle between the arcs or segments at the point of intersection lies in the range from about 40° to about 140°, in particular in a range from about 75° to about 105°, said value being in particular close to or substantially equal to 90°;

a horizontal projection of the overflight path includes one or more closed loops presenting a cross-point—or vertex—close to the touchdown point and corresponding to the point of intersection, which loop includes the arcs or segments;

the altitude of the aircraft is kept substantially constant while overflying along the arcs/segments or the loop;

during at least a portion of the overflight path, the altitude of the aircraft is maintained at a value close to—or less than—about 300 meters (m), and in part close to—or less than—about 100 m or 200 m;

during at least a portion of the overflight path, the speed of the aircraft is maintained at a value of about 10 meters per second (m/s) to about 50 m/s;

a rangefinder is used whose aiming axis forms an angle relative to the vertical, which angle lies in a range from about 0° to about 45°;

a rangefinder is used that presents an aiming axis of orientation that can be adjusted;

a Hough or Radon transform is used for analyzing the rangefinder data in order to improve detection of thread-like objects such as wires, cables, masts, or poles;

a first symbol representative of the touchdown point and a second symbol representative of a detected obstacle that does not form part of the database are displayed on a display device, preferably together with map data relating to a region around the touchdown point; and control signals are delivered to the controls of the aircraft to cause it to follow the overflight path.

In particular when the pilot of the aircraft is a human, it is preferable to present to the pilot, before and/or during takeoff from the touchdown point, a map of the region having encrusted therein symbols representative of the detected obstacles.

In another aspect of the invention, it is proposed to calculate a path for overflying a region on the basis of an on-board terrain and/or obstacle database, and to follow said path in order to acquire updated and completed terrain and obstacle data for the region by rangefinding, prior to approaching and landing at a point of the region.

In other words, a method is proposed for piloting an aircraft in the vicinity of a (touchdown) point comprising:

i) selecting a candidate path having a horizontal projection that includes a closed loop presenting a cross-point—or vertex—close to said (touchdown) point;

ii) associating the candidate path with a safe altitude;

iii) comparing data relating to the relief (of the terrain and of obstacles) in the vicinity of said (touchdown) point stored in an on-board memory with the candidate path associated with the safe altitude, in order to detect any interference between the relief and the candidate path;

iv) in the event of such interference being detected, modifying the candidate path and/or the safe altitude, and then repeating operation iii); and v) in the event that no interference is detected, detecting obstacles, and in particular obstacles that are not recorded in the on-board memory—or database—by using a detection method of the invention, while selecting the candidate path as the overflight path.

In a preferred implementation, in order to modify the candidate path, at least one of the following operations is performed:

increasing or decreasing the value of the radius/span of the loop depending on the relief and/or weather conditions, in the event that it is not possible for a safe overflight pattern to include two arcs or segments that cross at an angle of about 90°;

increasing or decreasing the value of the angle at the vertex of the loop depending on the relief encountered and on the necessary overflight altitude, in the event that it is not possible to reduce to acceptable dimensions the radius of the overflight with two arcs or segments that cross at an angle of about 90°;

shifting the candidate path in rotation centered on a point close to the (touchdown) point if the touchdown point is no longer found to be "possible" (forest, unpracticable terrain, etc. . . . ); and modifying the direction of the bisector of the angle at the vertex.

In another aspect, the invention provides a system for providing an aircraft with assistance in landing and taking off at a touchdown point, the system comprising:

an on-board display for displaying map data and symbols representative of obstacles;

an on-board database containing terrain or obstacle data;

an on-board positioning instrument for determining the current position of the aircraft;

an on-board memory for recording terrain or obstacle data additional to the database data;

an on-board rangefinder for acquiring terrain or obstacle data; and a computer connected to the display, to the database, to the positioning instrument, to the rangefinder, and to the memory, the computer being arranged/programmed where appropriate to control overflying of the touchdown point, to analyze the data delivered by the rangefinder while overflying and to record the analyzed data in the memory, and to display the data extracted from the database and at least one symbol representative of an obstacle detected by analyzing the rangefinder data.

In another aspect, the invention provides a program carried by a medium readable by an aircraft computer for the purpose of detecting obstacles in the vicinity of a touchdown point, the program comprising:

a code segment for determining a path to be followed by the aircraft when overflying the touchdown point;

a code segment for operating during overflying to record signal/data delivered by an on-board rangefinder observing a portion of the vicinity of the touchdown point;

a code segment for analyzing the rangefinder data, to detect the presence of obstacles and to determine their positions in a ground-based frame of reference, and where appropriate their dimensions; and a code segment for recording the position data and where appropriate the dimensions of the detected obstacle in a memory.

BRIEF DESCRIPTION OF THE DRAWINGS

Other aspects, characteristics, and advantages of the invention appear in the following description made with reference to the accompanying drawings which show, in non-limiting manner, preferred embodiments of the invention.

MORE DETAILED DESCRIPTION

Figure 1:
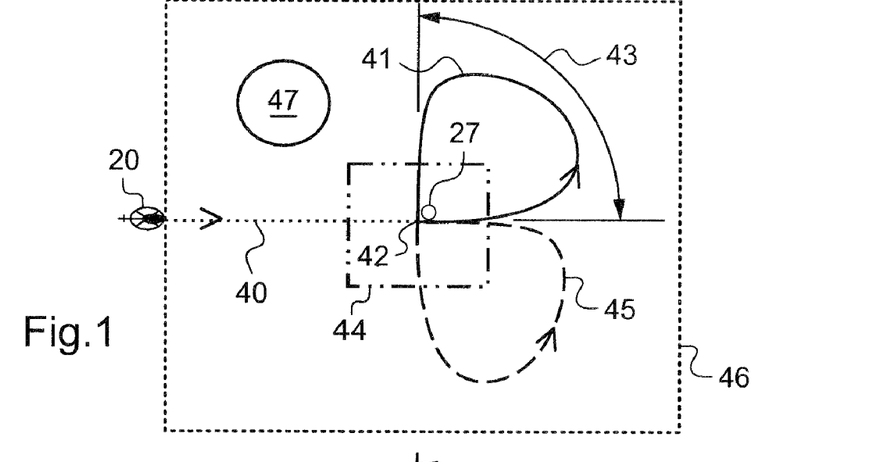
FIG. 1 is a plan view of a path for overflying a touchdown and landing point in a first embodiment of the invention.
Figure 7:
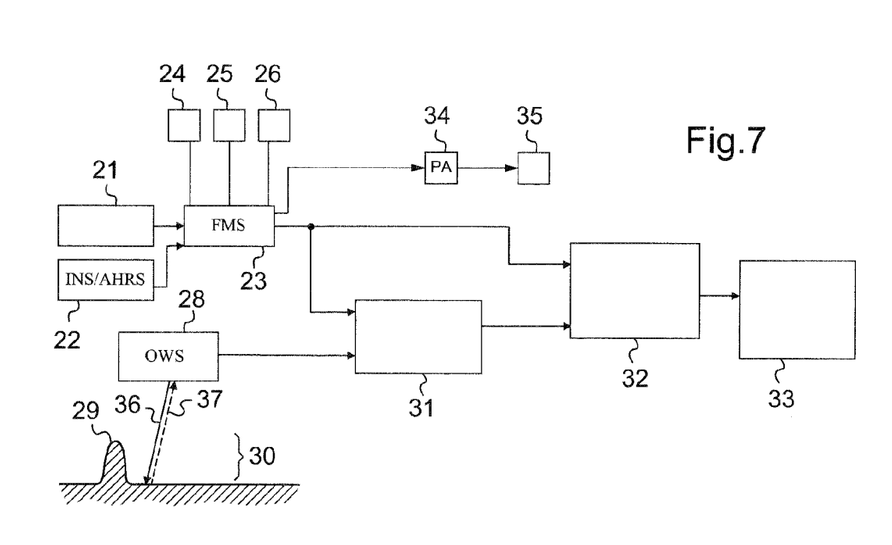
FIG. 7 is a diagram showing the main components of an on-board device or system of the invention, together with the connections therebetween.
Figure 8:
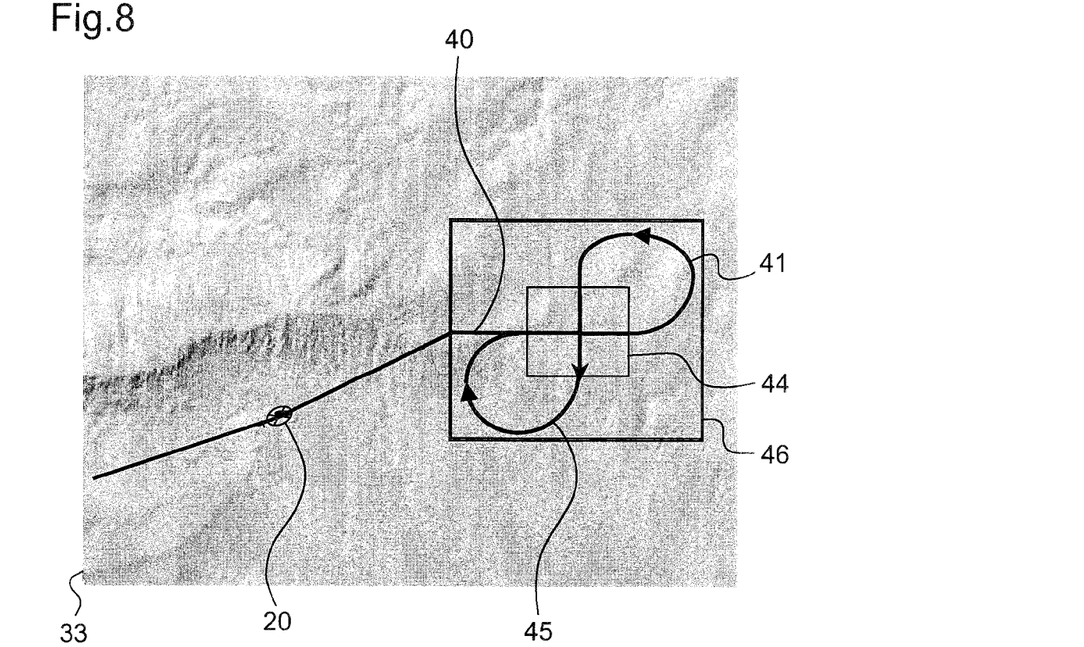
FIGS. 8 and 9 show two examples of a pilot display in accordance with an embodiment of the invention.

With reference to FIGS. 1 and 7 in particular, a helicopter 20 is fitted with a satellite positioning system 21 (e.g. GPS or EGNOS) and with an inertial measurement unit (or system) 22 (of the INS or AHRS type), together with a flight management computer 23 (of the FMS type) receiving data concerning the current position of the helicopter as delivered by the system 21 and/or the unit 22.

The on-board system of the invention further comprises a data input device 24, a terrain and/or obstacle database 25, and a memory 26 that are connected to and/or associated with the computer 23.

Figure 2:
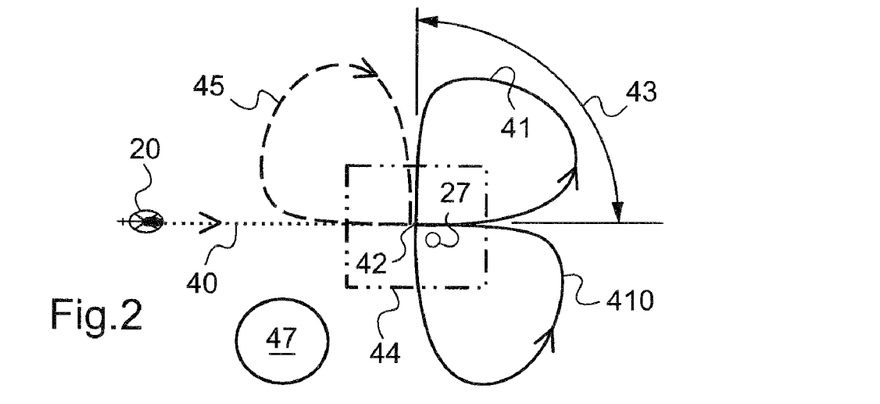
FIG. 2 is a plan view of a path for overflying a touchdown and landing point in a second embodiment of the invention.
Figure 3:
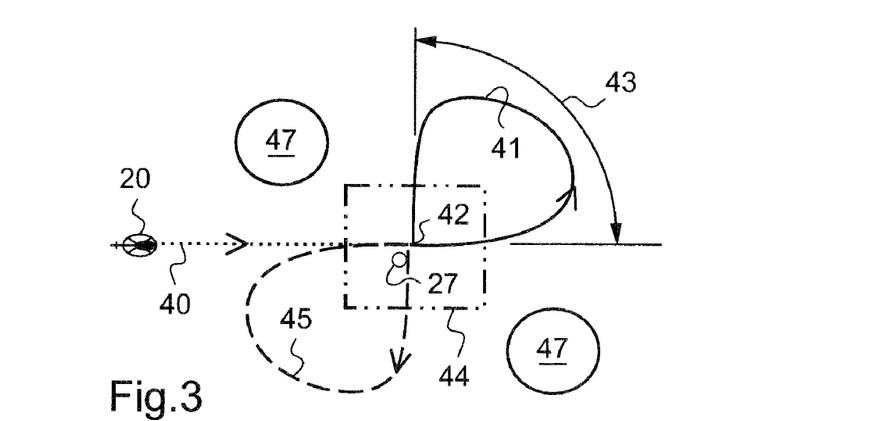
FIG. 3 is a plan view of a path for overflying a touchdown and landing point in a third embodiment of the invention.

The memory 26 contains configuration data for overflight and landing paths such as those shown in FIGS. 1 to 3.

The device 24 serves to input data into the computer 23 relating to the position of a desired touchdown point (referenced 27 in FIGS. 1 to 4), and where appropriate data selecting an overflight path configuration selected from amongst those stored in the memory 26.

The FMS manages information relating to the current position of the aircraft, the paths to be followed to "map" the obstacles around the touchdown zone, the generated flight plan, and the touchdown zone. It receives information coming from the instruments 21 and 22 and calculates the position of the aircraft, the attitude and heading angles, and an aircraft velocity in accurate manner.

An on-board laser rangefinder 28 emits a beam 36 and receives corresponding echoes 37 that are turned by the terrain 29 and the obstacles 30. The rangefinder measurement data or "plots" corresponding to the coordinates of a point of an obstacle or of the terrain in a frame of reference associated with the aircraft carrying the rangefinder is delivered by the rangefinder to an analysis unit or module 31 for detecting obstacles such as overhead cables, and for recording the analyzed data.

The OWS delivers "raw plot" data associated with time and velocity information. The plots are then reproduced in a frame of reference associated with the ground and analyzed to extract therefrom the detected cables or other obstacles.

Figure 5:
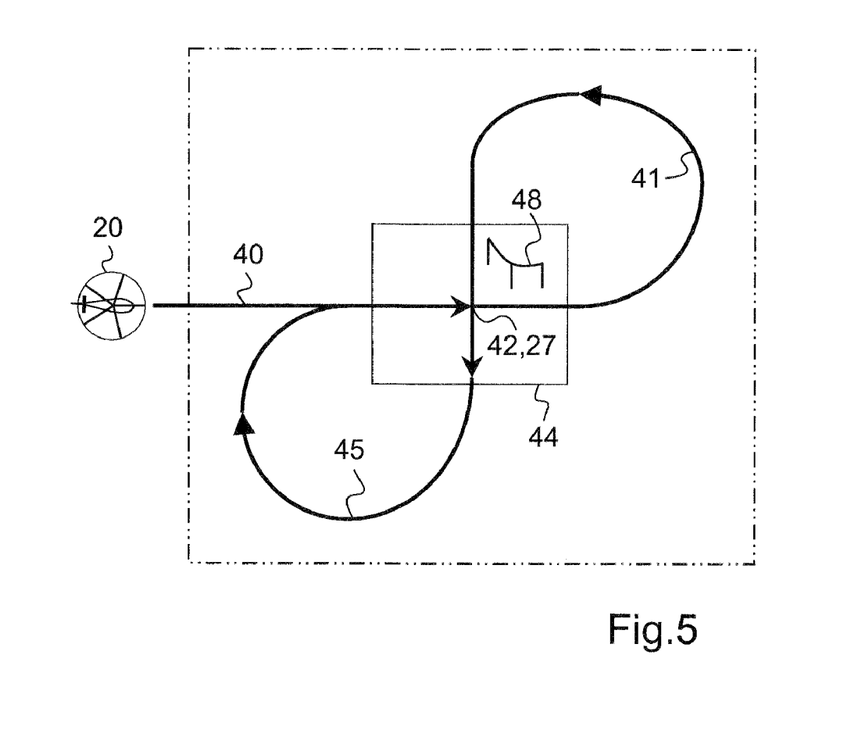
FIG. 5 is a view similar to FIG. 3 showing an obstacle situated in the vicinity of the touchdown point.
Figure 9:
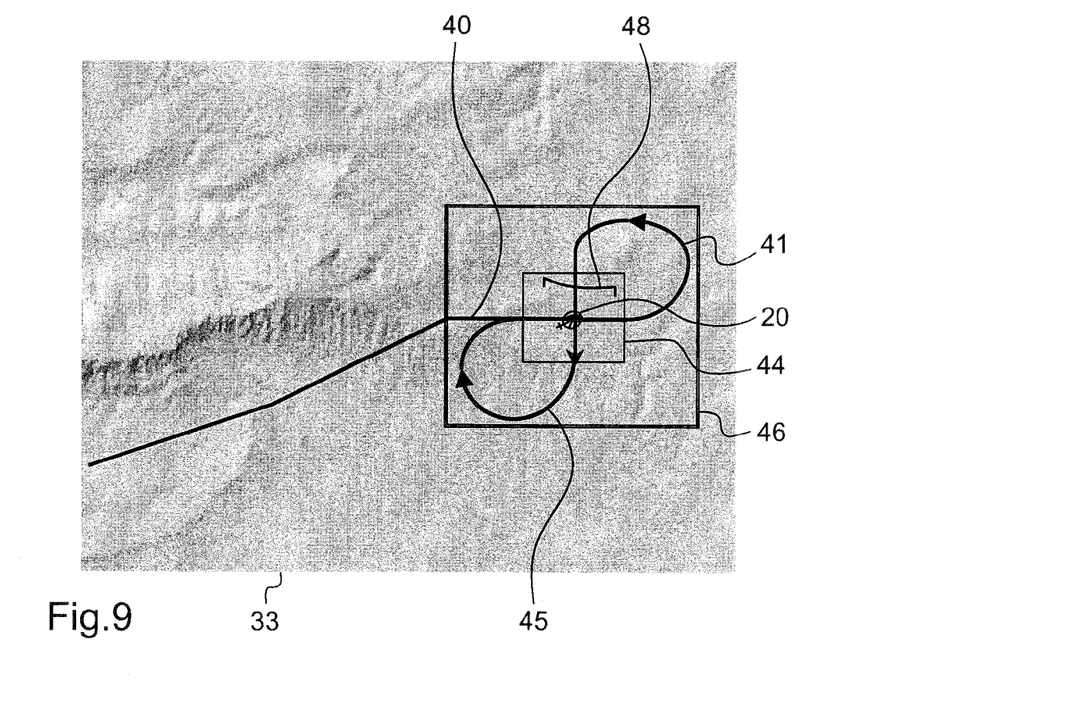

The computer 23 delivers data recorded in the database 25 to a module 32 which compares said data with the data resulting from the module 31 analyzing the rangefinder data; the module 32 thus locates obstacles that have been detected but that are not listed in the database, and it delivers the corresponding data to a display module 33 for displaying a map of detected but non-listed obstacles on a background, as shown diagrammatically in particular in FIGS. 5 and 9.

By default, the computer 32 delivers the cartographic view for the pilot associated with the present position of the helicopter. The computer 32 also locates the precise positions of detected obstacles on the basis of data coming from the OWS and the FMS, and it manages the map display information. Thus, on the basis of the data received concerning cables (height, size, position, etc. . . . ), symbols representative of the detected obstacles are displayed.

The computer 23 also has a module for searching for possible interference between a candidate overflight path and the data recorded in the database 25. When no interference is detected by this module, the computer 23 can deliver data to the autopilot 34 enabling it to control the controls 35 of the aircraft, in particular to control variations in the cyclic pitch and the collective pitch of the blades of a lift and propulsion rotor of a rotorcraft, so that the aircraft follows said overflight path.

The data delivered by the rangefinder (OWS) coupled with the navigation instrument can be analyzed by a cable detecting and/or locating method making use of a Hough transform or a Radon transform.

In the embodiments shown in FIGS. 1 to 4 in particular, after a candidate touchdown point 27 has been selected, the helicopter 20 follows a path 40 so as to be positioned substantially vertically over said point, at a determined altitude.

The computers 23 and 34 then operate the controls 35 so that the aircraft follows an overflight path 41 in the form of a loop presenting a cross-point 42 which, when projected onto a horizontal plane containing the touchdown point substantially coincides with said touchdown point 27. In FIG. 2, the overflight path includes two successive cross-point loops 41 and 410.

Figure 4:
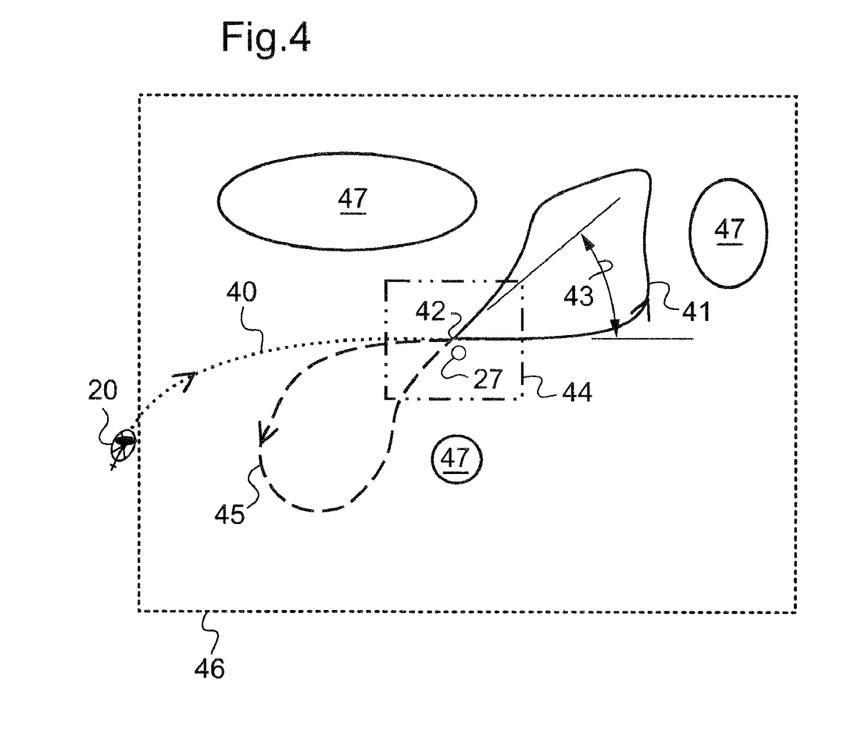
FIG. 4 is a plan view of a path for overflying a touchdown and landing point in a fourth embodiment of the invention.

By following this path 41, the aircraft makes a first pass vertically over the (estimated) touchdown point at an altitude and a speed that are determined, followed by a second pass vertically over the same point, with the angle 43 formed (in the plane of FIGS. 1 to 5, 8 and 9) by the corresponding segments of said path being close to 90° in the configurations shown in FIGS. 1 to 3, 5, 8, and 9, or close to about 45° in the configuration corresponding to FIG. 4.

After the overflight, the aircraft follows a landing path 45 to the touchdown point, with the projection of the landing path onto a horizontal plane likewise being in the form of a loop with a cross-point.

The current position of the helicopter is provided by the navigation equipment 21, 22 with the highest possible accuracy so as to be able to locate accurately the cables and other obstacles in a volume 44 surrounding the touchdown point.

The obstacles detected by the OWS 28 are located and dimensioned using information that enables them to be defined (altitudes of the tops of pylons, positions of the attachment points of overhead cables, heights, etc.), and then displayed on a map background including the vicinity 44 of the touchdown point together with the current position of the helicopter 20.

The invention serves in particular to remedy the decrease in the range at which a laser rangefinder can detect a cable as a function of the angle of incidence of the laser beam on the cable.

Figure 6:
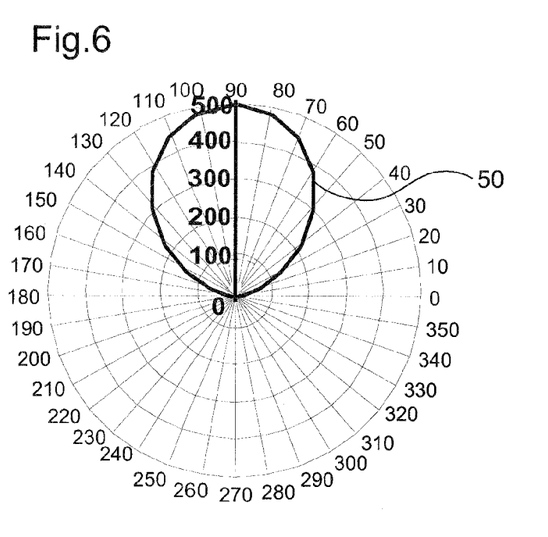
FIG. 6 is a diagram showing the mean variation (with sufficient probability of detection) in the range at which a cable can be detected by rangefinding, plotted as a function of the angle of incidence of the axis of the rangefinder beam relative to the cable.

The maximum range d at which a cable having a diameter of 6 mm can be detected with a detection probability Pd of 99.5%, as a function of the angle of incidence θ, can be approximated by the formula:

$$d = f(\theta) = p_{max} \sin^2(\theta)$$

where $p_{max}$ represents the maximum range of the rangefinder for a given probability Pd.

The curve or plot 50 of FIG. 6 shows variations in the performance of a laser OWS for a 6 mm cable made of aluminum visible at least with an aperture α=5° in clear weather or fine rain, for an angle of incidence covering the 0° to 350°. It can be seen that the range is as great as 500 m for an angle of incidence of 90°, is zero for an angle of incidence of 0°, and is about 200 m for an angle of incidence of 40°.

In foggy weather, the maximum range is further reduced by 10% to 15%. The probability Pd is a probability of detecting one obstacle per second. The duration of detection during a pass is given by the formula:

$$t = d/v$$

where v represents the speed of the aircraft.

The probability of non-detection Pnd is given by:

$$Pnd = (1-Pd)^t = (1-Pd)^{[f(\theta)/v]}$$

By making two passes at 90° over a touchdown area, the probability of non-detection becomes:

$$Pnd = (1-Pd)^{[f(\theta)+f(90°-\theta)/v]}$$

With the function:

$$f(\theta) = p_{max} \sin^2(\theta)$$

this gives:

$$Pnd = (1-Pd)^{p_{max}/v}$$

Thus, with two overflights at 90°, the probability of non-detection of a cable does not depend on the angle of incidence of the selected approach or take-off path.

With passes carried out at a speed of about 40 knots, a probability of non-detection is obtained that is about 2.44× $10^{-28}$; the problem of making the system safe then depends only on its various components functioning properly.

In order to ensure that the touchdown zone 44 is safe without taking any risk and without making the OWS inoperative, it is preferable to use an overflight altitude of about 100 m to 300 m.

Consequently, an optimum path for overflying said point comprises two perpendicular passes vertically over the touchdown point. This path presents the advantage of enabling the aircraft to touch down following an approach along an axis that has already been followed.

With certain FMSes, the overflight patterns programmed for search and rescue (SAR) missions can be used unaltered, or else they can be adapted to perform two overflight passes over the touchdown zone with different heading angles.

In one embodiment, when the touchdown point is predetermined, the pilot can program the FMS with the touchdown point at the end of its flight plan (identified in latitude or longitude or in some other way) in the most accurate manner possible.

The FMS generates the paths 40, 41, 410, and where appropriate 45 to be followed by the aircraft. On the basis of terrain data contained in the database 25, if the pilot has not input a "valid" altitude, the computer 23, 32 calculates the minimum safe height at which the helicopter can overfly the zone 46 including said paths. When the overflight pattern 41 extending the leg 40 interferes with relief (referenced 47 in FIGS. 1 to 4), the computer 23, 32 recalculates another candidate overflight pattern by applying transformations to the pattern suffering interference (e.g. by rotating it, etc.), until it finds a "safe" overflight path.

When the touchdown point is not predetermined, the pilot can make a first path at a safe altitude to locate the touchdown point which is then entered into the FMS (at the end of the leg, or otherwise). Once the touchdown point has been input, the procedure for selecting the overflight path and where appropriate the landing path is performed in the same manner as that described above.

After touching down, the system can display (FIGS. 5, 9) on the device 33 symbols that represent the presence of obstacles 48 detected around the touchdown point in the safe zone 44.

When no good candidate overflight path can be found because of relief in the region 46 around the region 44, the system can: i) either display to the pilot that it is not possible to make the touchdown zone safe; ii) or else program a safe overflight loop that does not interfere with the relief, but that does not optimize cable detection, and indicate using a graphic symbol or a color that the probability of detecting cables is not at its maximum; depending on the value of the angle 43 that is used, the system can inform the pilot that cable detection is not up to the regulatory minimum but is at a lower percentage.

Figure 10:
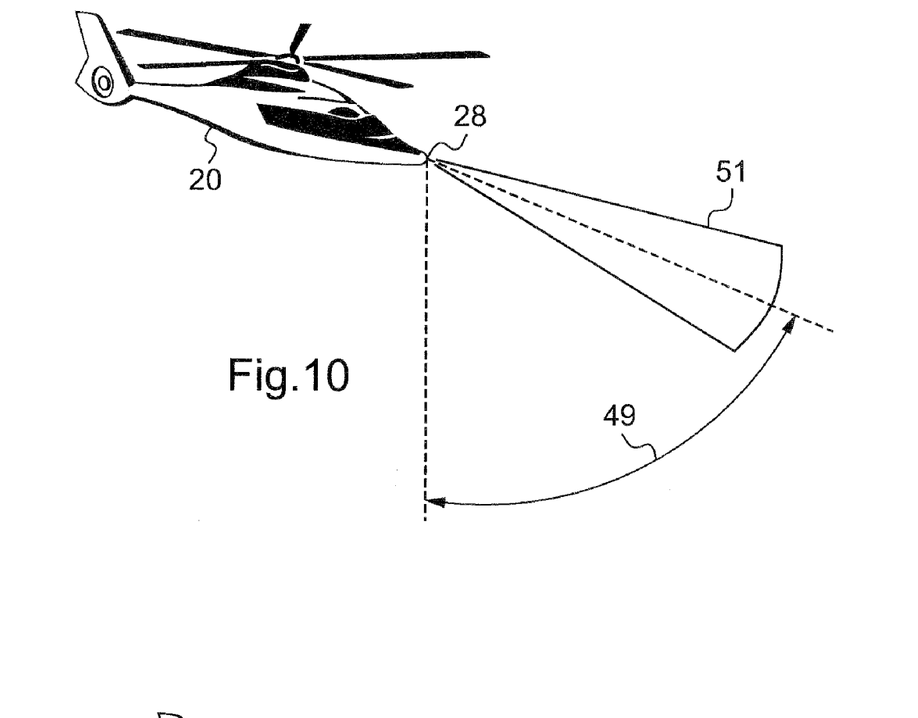
FIGS. 10 and 11 are diagrams showing a helicopter and the observation beam of an on-board scanning laser rangefinder, for two distinct orientations of the rangefinder.
Figure 11:
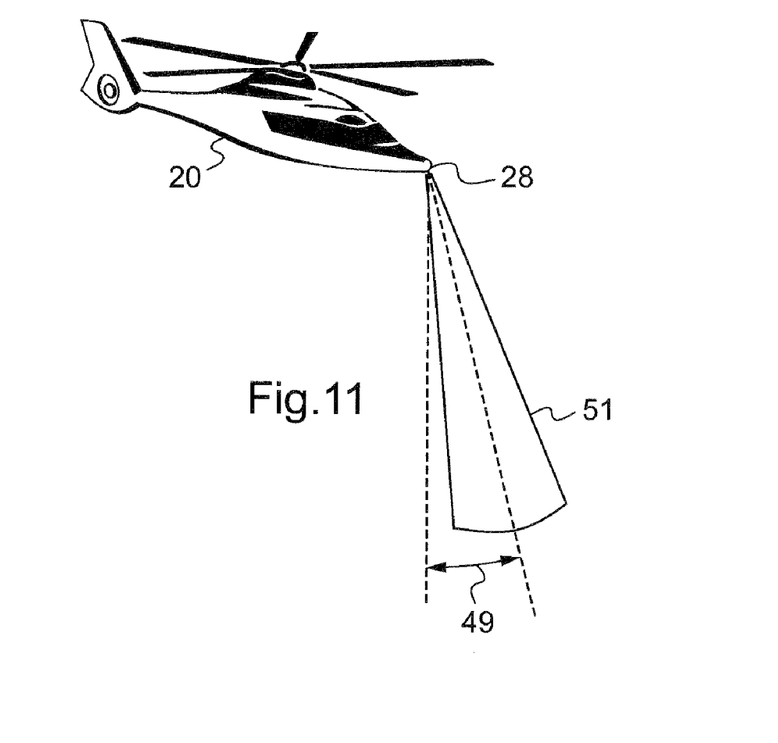

For the procedure of overflying the touchdown zone, it is possible to lower (FIG. 11) the vertical orientation 49 (FIG. 10, 11) of the rangefinder beam 51 in order to improve the probability of detection. This also enables the pilot to fly at an altitude that is higher (and thus safer) while retaining the same level of performance for the system.

The invention makes it possible to detect cables at night in more reliable and accurate manner. The pilot can then prepare takeoff and a flight plan with less worry. The invention saves time in carrying out missions such as rescuing or transporting troops in a conflict zone; a few minutes can suffice to detect and locate obstacles in reliable manner in a zone having an area of about 10,000 square meters surrounding the touchdown point.

What is claimed is:

1. A method of detecting on board an aircraft obstacles in a vicinity of a touchdown point, the method comprising the following operations:

determining an overflight path for the aircraft to overfly the touchdown point, a horizontal projection of the overflight path comprising two arcs or segments that cross at a point of intersection close to the touchdown point;

the aircraft overflying the touchdown point following the overflight path so that the aircraft performs in succession two overflights of the touchdown point following two different headings, and during the overflight, recording data delivered by an on-board rangefinder observing a portion of the space extending below the aircraft;

analyzing the data from the rangefinder to detect the presence of obstacles and to determine their positions in a terrestrial frame of reference; and recording the position data of the detected obstacles in a memory, and wherein a value of an angle formed by the arcs or segments at the cross-point lies in a range from about 40° to about 140°.

2. The method according to claim 1, in which the aircraft performs only two overflights of the touchdown point.

3. The method according to claim 1, in which the value of the angle is situated in a range from about 75° to about 105°.

4. The method according to claim 3, wherein the value of the angle is about 90°.

5. The method according to claim 1, in which a horizontal projection of the overflight path includes one closed loop having the point of intersection, the loop including the crossing arcs or segments.

6. The method according to claim 5, in which an altitude of the aircraft is maintained substantially constant while overflying along the arcs or segments or the loop.

7. The method according to claim 1, in which, at least during a portion of the overflight path, an altitude of the aircraft is maintained at about 300 m or less.

8. The method according to claim 7, wherein, at least during a portion of the overflight path, the altitude of the aircraft is maintained at about 200 m or less.

9. The method according to claim 8, wherein, at least during a portion of the overflight path, the altitude of the aircraft is maintained at about 100 m or less.

10. The method according to claim 1, in which, at least during a portion of the overflight path, a speed of the aircraft is maintained at a range of about 10 m/s to about 50 m/s.

11. The method according to claim 1, in which the rangefinder has an aiming axis forming an angle relative to a vertical lying in a range from about 0° to about 45°.

12. The method according to claim 1, in which the rangefinder is a laser scanning rangefinder that is used to detect obstacles.

13. The method according to claim 1, in which the rangefinder presents an aiming axis of adjustable orientation.

14. The method according to claim 1, in which a Hough transform or a Radon transform is used for analyzing the data from the rangefinder in order to improve detection of thread-like objects comprising wires, cables, masts, or poles.

15. The method according to claim 1, in which a first symbol representative of the touchdown point and a second symbol representative of a detected obstacle that does not form part of a database are displayed on a display device together with map data relating to a region surrounding the touchdown point.

16. The method according to claim 1, in which control signals are delivered to controls of the aircraft in order to cause the aircraft to follow the overflight path.

17. The method as claimed in claim 1, further comprising analyzing the data of the rangefinder to determine dimensions of said detected obstacles and recording the dimensions in the memory.

18. A method of piloting an aircraft in a vicinity of a touchdown point, the method comprising the following operations:

acquiring on board the aircraft rangefinder measurement data of a region of ground surrounding the touchdown point, while the aircraft is overflying said region following an overflight path having a horizontal projection that includes two arcs or segments that cross at a point of intersection close to the touchdown point, a value an angle formed by the arcs or segments at the cross-point lying in a range from about 40° to about 140°;

analyzing said data on board the aircraft to identify, position, and then determine dimensions of relief or obstacles;

recording data relating to the positions and the dimensions of the obstacles detected by the rangefinder; and after landing in the vicinity of the touchdown point, using said recorded data to determine a takeoff flight path.

19. A method of piloting an aircraft in a vicinity of a touchdown point, the method comprising the following operations:

i) selecting a candidate path having a horizontal projection that comprises a closed loop having a cross-point in the vicinity of the touchdown point, the loop including two crossing arcs or segments, a value of the angle formed by the arcs or segments at the cross-point lying in a range from about 40° to about 140°;

ii) associating the candidate path with an altitude chosen by an operator;

iii) comparing data relating to relief of terrain and to obstacles in the vicinity of the touchdown point as recorded in an on-board memory with the candidate path associated with the altitude chosen by the operator in order to detect any interference between the relief and the candidate path;

iv) in the event of such interference being detected, modifying at least one of the candidate path and the altitude chosen by the operator, and then repeating the comparison operation iii); and v) in the event that no interference is detected, detecting obstacles by determining an overflight path for the aircraft to overfly the touchdown point, a horizontal projection of the overflight path comprising two arcs or segments that cross at a point of intersection close to the touchdown point; the aircraft overflying the touchdown point following the overflight path so that the aircraft performs in succession two overflights of the touchdown point following two different headings, and during the overflight, recording data delivered by an on-board rangefinder observing a portion of the space extending below the aircraft; analyzing the data from the rangefinder to detect the presence of obstacles and to determine their positions in a terrestrial frame of reference; and recording position data of the detected obstacles in a memory, and wherein a value of an angle formed by the arcs or segments at the cross-point lies in a range from about 40° to about 140°, while selecting the candidate path as the overflight path.

20. The method according to claim 19, in which, in order to modify the candidate path, at least one of the following operations is performed:

increasing or decreasing the value of the angle at the cross-point of the loop;

modifying the direction of a bisector of the angle at the cross-point of the loop;

increasing or decreasing a value of a span of the loop; and displacing the candidate path by rotation centered on a point close to the touchdown point.

21. The method as claimed in claim 19, further comprising analyzing the data from the rangefinder to determine dimensions of said detected obstacles and recording the dimensions in the memory.

22. A system for assisting landing and takeoff of an aircraft at a touchdown point, the system comprising:

an on-board display for displaying map data and symbols representative of obstacles;

an on-board database containing terrain or obstacle data;

an on-board positioning instrument for determining a current position of the aircraft;

an on-board memory for recording terrain or obstacle data in addition to the data in the database;

an on-board rangefinder for acquiring terrain or obstacle data; and a computer connected to the display, to the database, to the positioning instrument, to the rangefinder, and to the memory, the computer being programmed to i) control overflight of the touchdown point following an overflight path having a horizontal projection comprising two arcs or segments that cross at a point of intersection close to the touchdown point, a value of an angle formed by the arcs or segments at the cross-point lying in a range from about 40° to about 140°, ii) analyze the data delivered by the rangefinder and record the analyzed data in the memory, and iii) display data extracted from the database together with at least one symbol representative of an obstacle detected by analyzing the data delivered by the rangefinder.

23. A computer readable storage medium readable by a computer of an aircraft, said computer readable storage medium tangibly embodying a computer program therein, the program serving to detect obstacles in a vicinity of a touchdown point, and comprising:

a code segment for determining a path to be followed by the aircraft overflying the touchdown point, a horizontal projection of the overflight path having two arcs or segments that cross at a point of intersection close to the touchdown point, a value of an angle formed by the arcs or segments at the cross-point lying in a range from about 40° to about 140°;

a code segment for acting during the overflight to record data delivered by an on-board rangefinder observing a portion of the vicinity of the touchdown point;

a code segment for analyzing the data from the rangefinder, to detect a presence of obstacles and to determine their positions in a terrestrial frame of reference; and a code segment for recording detected obstacle position data in a memory.

24. The computer readable storage medium of claim 23, wherein said code segment for recording detected obstacle position data in the memory records detected obstacle dimensions in the memory.

25. The computer readable storage medium as claimed in claim 23, wherein the code segment for analyzing the data from the rangefinder determines dimensions of said obstacles; and wherein the code segment for recording detected obstacle position data in the memory records dimension data in the memory.

* * * * *